Figure 1:
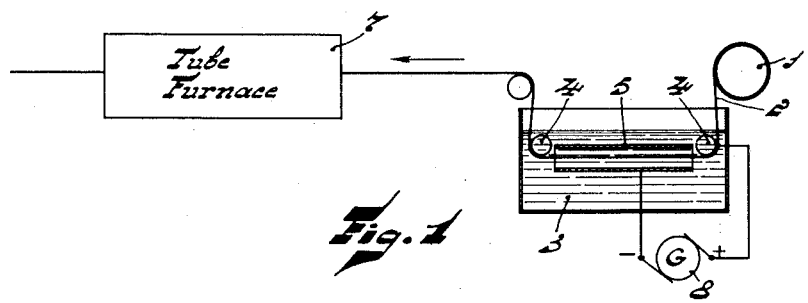

June 8, 1943. E. J. W. VERWEY ET AL 2,321,439
METHOD OF MAKING VITREOUS COATED BODIES
Filed Aug. 19, 1937

INVENTORS
EVERT JOHANNES WILLEM VERWEY
PAUL CHRISTIAAN VAN DER WILLIGEN
and JOHANNES HOEKSTRA
BY
ATTORNEY.

Patented June 8, 1943

2,321,439

UNITED STATES PATENT OFFICE 2,321,439

METHOD OF MAKING VITREOUS COATED BODIES

Evert Johannes Willem Verwey, Paul Christiaan van der Willigen, and Johannes Hoekstra, Eindhoven, Netherlands, assignors, by mesne assignments, to Hartford National Bank and Trust Company, Hartford, Conn., as trustee Application August 19, 1937, Serial No. 159,986
In the Netherlands September 26, 1936

1 Claim. (Cl. 204—37)

Our invention relates to bodies provided with a layer in a glass state and to a method of applying such layers.

Our invention is adapted for use in any instance in which a conductive body is to be provided with a vitreous coating. For example, it may be used for forming a vitreous insulating coating on wire, for forming a dielectric layer in electrical condensers, and for forming a heat-resistant protective layer on resistance units. Furthermore, the method of the invention is of particular advantage in manufacturing enameled ware, such as cooking utensils.

In accordance with the invention, we place the materials to be used for forming the coating in suspension in a suitable medium, and then apply this finely-divided material as a coating to the body or substratum by electrophoresis, after which we heat the coated body, if desired in a non-oxidising atmosphere, to obtain a coherent layer in a vitreous state.

The body to be coated, which serves as an electrode during the electrophoresis, may be of conductive or semi-conductive material, and it is also possible to use a body of insulating material provided its surface is made sufficiently conductive.

The method of the invention has the advantage that the thickness of the electrophoretically-applied layer can be readily and accurately controlled and can be varied within a large range, for example, from a few microns to a few millimetres, by proper selection of the operating conditions, such as the concentration of the suspension, the duration of and potential drop during the electrophoresis, etc. Furthermore, it is unnecessary to use the binders or stiffening agents frequently used, particularly in the enamelling industry. As the particles of the coating are applied electrophoretically, they are piled on the substratum in such a compact manner that proper adherence is obtained, and the subsequent heating eliminates the space between the deposited particles with only a small amount of shrinkage. It is thus possible to avoid the formation of small gas bubbles in the finished product.

The invention is particularly useful for forming insulating coatings on electrical wires which are used, for example, in coils. Such wires are usually provided with a coating of an organic insulating material, and as such material is very unstable under heat, the electric load which can be applied to such coils is limited. By providing such wire with a vitreous layer by the method of the present invention, it is possible to apply a much higher load because of high heat resistance of such materials. Thus, a coil wound with such insulated wire can be made magnetic to a much higher extent, or it can be smaller, which results in a saving in the metal of both the wire and of the core, which is particularly important in the case of transformers.

The invention can also be used for making electrical condensers, in which case we employ vitreous materials which are good dielectrics and have a high breakdown voltage, and apply the same in very thin layers to a conductor. Thus it is possible in a simple manner to make a good condenser of advantageous form and of small volume by providing a tubular conductive body or a wire with a coating of vitreous material having good dielectric properties, and by then surrounding the coated body with conductive material, such as a film of metal or graphite, or with a winding of thin metal wire.

Plate or band shaped bodies may be coated by the method of the invention, in such a manner that their edges are fully coated. This is particularly advantageous in connection with electric applications in which the coated material must be wound or piled, or in utensils of various types, such as pots and pans.

Coated bodies produced by the method of the invention, particularly metal wires, can be used in an evacuated space without danger of gas evolving from the insulating coating, as is the case with coating of organic materials.

In addition, the vitreous coating according to the invention may be utilised to protect a body against the atmosphere. For instance, electrically-conductive material used for resistances which operate at a high temperature, for example heating elements, or resistance units in the form of rods, tubes or discs, and having either a positive or a negative temperature coefficient, may be coated by the method of the invention with a protective vitreous coating of high melting or softening point. For example, we may provide a resistance having carbon as the conductive material with a protective vitreous layer.

Furthermore, we may provide a flexible wire, band or the like, with a very thin vitreous coating of favorable flexibility which can be controlled to a large degree by varying the temperature and duration of the heating operation. More particularly if the heating operation is carried out at a moderate temperature and only sufficiently long to cause coherence of the applied particles to each other and to the wire, a high flexibility is obtained. By heating at a higher temperature, the flexibility is generally less, but very compact and continuous coatings are obtained.

In cases in which there is danger of injury to the coating by mechanical deformation of the body, for instance where a wire provided with such a coating is wound into a coil, we terminate the subsequent sintering-heating operation as soon as sufficient coherence is obtained. We then form the coated material into the desired form, and subsequently continue the heating to obtain the desired final state.

The invention offers the additional advantage that bodies obtained in accordance with the invention can be used in a high temperature medium.

In carrying the method according to the invention into practice, we prefer to use suspensions containing particles of the order of magnitude of 1 or a few microns, and to start with coating materials which are already in a glass state before they are placed in suspension. If the starting material is a mixture of two or more substances which are jointly capable of forming a glass upon being heated, and if the substances are to be applied to the substratum at the same time and are therefore mingled together as satisfactorily as possible, it is necessary that the substances have identical signs of charge in the suspension medium chosen, and it is desirable that the speeds of electrophoresis of the various particles should not differ by too much.

It is possible to use a mixture which consists of two or more types of glass, or consists wholly or partly of substances which themselves are not in a glass state but the mixture of which is capable of being transformed by heat into a vitreous material.

It is also possible to start with a powdered mixture of glass and an additional substance which, during the heating operation, does not flow and preferably does not react strongly with the glass.

Preferably, the coefficient of expansion of the coating in its glass state is generally altered to agree with that of the substratum.

Adherence of the particles to the electrode is greatly assisted by the use of stable suspensions, i. e. suspensions whose particles are fully peptised. In addition, for proper adherence to the electrode, the method described in the German Patent No. 625,217 may be advantageously used, so that undesirable evolution of gas from the electrode is suppressed.

Figures 2, 3:
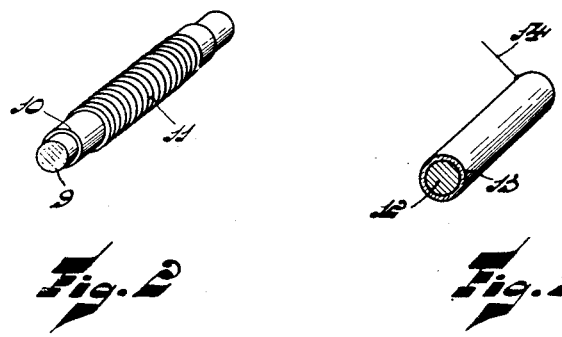

In order that the invention may be clearly understood and readily carried into effect we shall described the same in more detail in connection with several specific examples and with reference to the accompanying drawing in which, Figure 1 is a diagrammatic view of an apparatus for carrying out the method of the invention, Fig. 2 is a perspective view of a condenser according to the invention, and Fig. 3 is a sectionized perspective view of a resistance according to the invention.

*Example I*

100 grams of a glass containing 40% silicon dioxide ($SiO_2$), 50% lead oxide (PbO), and in addition smaller quantities of aluminum oxide ($Al_2O_3$) and alkali, are pounded until the powder passes entirely through a sieve whose meshes pass exactly particles of 100$\mu$. This powder with about 250 c. c. of water is placed in a porcelain ball mill of 1 liter capacity about half filled with porcelain balls about 2 to 3 cms. in diameter. The glass powder is ground for about 3 days with the mill operating at about 60 R. P. M. The suspension so obtained is treated with about quarter its volume of dilute hydrochloric acid (2 normal), and after about 5 minutes it is sucked off through a filter having very fine pores. The glass powder, after being washed out with distilled water and dried, is introduced in 1 liter of acetone and fully peptised by shaking. The particles are negatively charged.

The suspension obtained in the manner described above is especially suitable for applying the suspended particles as a thin layer to a wire. For example, as indicated in Figure 1 a copper wire 2 about 200$\mu$ in diameter is unwound from a spool I and passes over rollers 4 through a bath 3 consisting of 1 part by volume of the above-mentioned suspension and 10 parts by volume of acetone. Wire 2 passes through an axial cylinder 5 of sheet nickel which acts as the negative electrode. Wire 2 is given a positive potential of about 100 volts with respect to cylinder 5 by means of a generator 8. The coated wire then passes through a tube furnace 7 about 1 meter long and having an atmosphere of carbonic acid gas to prevent oxidation of the wire. If the wire passes through the furnace with a speed of 10 cm. per sec. we obtain, with a temperature of the furnace wall of about 825° C., a smooth, transparent and compact glass coating.

If the furnace is given a temperature of about 700° C., a slightly sintered, dim and more flexible glass layer is obtained. In this case, the coating may be caused to flow together, completely if desired, after the wire is wound into the desired shape, for instance a coil, by heating the coil for several minutes in a furnace heated to about 800° C. and having a carbonic acid atmosphere. If the electrically insulating layer has a thickness of about 20$\mu$, the breakdown voltage exceeds 1000 volts. It should be noted that the suspension must be stirred to prevent setting of the suspended material, particularly during the electrophoresis. This also applies to the examples described below.

*Example II*

In manufacturing a condenser such as shown in Fig. 2, an elongated copper body 9 which may be a wire or a tube, having an external diameter of 3 mm. and a length of 3 cm. is coated to a length of about 2.5 cm. with a thin layer 10 of the glass powder described in Example I. For this purpose the body 9 is immersed to a depth of 2.5 cm. in the undiluted suspension in acetone mentioned in Example I. It is then given for several seconds a positive voltage of 50 volts with respect to a surrounding nickel cylinder such as illustrated in Fig. 1. The coated body is then allowed to remain for about five minutes in a furnace filled with carbonic acid gas and heated to about 780° C., whereby a smooth, comparatively transparent and compact glass layer 10 having a thickness of about 40$\mu$ is obtained. A thin metal wire 11 is then wound upon layer 10 over a length of about 1.5 cm. The resulting condenser has a breakdown voltage of about 2000 volts, a loss factor ($tg\delta$) of about $10^{-3}$ measured at a wave length of 200 meters, and a capacity of about 200 cm.

*Example III*

100 grams of black enamel consisting of 65% lead oxide (PbO), 7% silicon dioxide ($SiO_2$), 16% boron oxide ($B_2O_3$) and in addition smaller amounts of chromium oxide ($Cr_2O_3$), aluminum oxide ($Al_2O_3$), cupric oxide (CuO), zinc oxide (ZnO), and cobaltous oxide (CoO) are ground for about six days in 250 c. c. of water in a porcelain ball mill of the same size as that of Example I. The suspension obtained is separated by filtering with a sucking filter of very fine pores, washed with distilled water, and dried. The dry material is rubbed down and then, by shaking, suspended in a liter of pure methanol. The particles of this suspension are positively charged.

In the manner described in Example I, a copper wire of $200\mu$ diameter is coated with a coating about $10\mu$ thick of this enamel by passing the wire through a bath prepared from one part by volume of the suspension diluted with 10 parts by volume of methanol, and with the use of a negative voltage of 50 volts. At a furnace temperature of about 500° C., the enamel flows together to form a smooth, compact, and coherent layer having good electrically insulating properties.

Example IV 1 kg. of a very hard type of glass containing about 55% silicon dioxide ($SiO_2$), 20% aluminum oxide ($Al_2O_3$), 4% boron oxide ($B_2O_3$), 8% of calcium oxide (CaO), 9% of magnesium oxide (MgO) and in addition small amounts of barium oxide (BaO), alkali, and antimony, is crushed, sieved and, with the addition of about 2 liters of water, ground for about two days in a steel ball mill of 5 liters capacity half filled with steel balls 3 cm. in diameter. About 500 c. c. of hydrochloric acid (25%) is then added to the suspension and when all the iron particles originating from the ball mill are dissolved, is sucked off through a filter of the fine pores. Finally the glass powder is purified by washing and, if necessary, renewed suspending in distilled water. The material obtained after drying and trituration is suspended in acetone by shaking, and the suspension is replenished with acetone to a volume of 5 liters. The particles carry a negative charge.

A resistance rod, such as shown in Figure 3, and having a high negative temperature coefficient of resistance can be formed in the following manner: A core 12 of clay and silicon sintered together is coated with a layer 13 of the above glass and having a thickness of about $250\mu$ by introducing it into the above-mentioned suspension and by giving core 12 for a few seconds a positive potential of about 70 volts relatively to a surrounding nickel electrode. Heating is then effected in an atmosphere of carbonic acid gas, or of nitrogen and hydrogen, for about 10 minutes at 1000° C. whereby the glass layer 13 flows together to form an airtight layer. A lead 14 extends through the layer 13 in an airtight manner. The resistance so obtained may be used at a red heat without being attacked by air.

Example V

A suspension prepared in a manner similar to Example IV is mixed with a suspension of 70 grams of finely-powdered boric acid (7% relatively to the hard glass) in acetone. In a manner similar to that described in Example IV, a film of the glass and the boric acid are placed jointly on the rod to a thickness of about $500\mu$, and the layer is then heated in a reducing atmosphere to about 980° C. for 10 minutes whereby it is melted together to form a properly adhering compact glass layer.

Example VI 100 grams of the glass described in Example I is ground in the manner described in this example and is further treated in the following manner: The filter cake obtained in Example I is introduced in its moist condition into 1 liter of distilled water and peptised therein by shaking. The suspended particles are negatively charged. A length of copper wire is provided by means of this suspension with a thin layer by applying a positive voltage of about 10 volts for about 1 minute. The copper wire thus coated is then heater for 5 minutes in a furnace at 780° C. and having an atmosphere of carbonic acid gas.

It should be noted that if water is used as the dispersing agent there will be a disturbing evolution of gas from the electrode and the copper wire will be slightly attacked. Although these disadvantages can be overcome by applying a lower voltage during the electrophoresis, this method does not generally produce a layer as smooth and continuous as that of Examples I and II.

Example VII 100 grams of a hard type of glass containing about 57% silicon dioxide ($SiO_2$), 22% aluminum oxide ($Al_2O_3$, 5% boron oxide ($B_2O_3$), 5% calcium oxide (CaO), 9% magnesium oxide (MgO), and 2% potassium oxide ($K_2O$) are crushed, sieved and, with the addition of 250 c. c. of water, ground for four days in a porcelain ball mill of 1 liter capacity. The very fine glass powder thus obtained is sucked off on a filter of fine pores, washed out with distilled water, and dried. The dry material is triturated and then introduced into 1 liter of pure methanol. After sufficiently strong hydrochloric acid is added so that its final concentration is 0.2 milliequivalent per liter, the particles are peptised by shaking. The particles are charged positively.

In a manner similar to that described in Example IV, a resistance rod acting as the negative electrode is coated with a layer of this glass, the layer being heated to about 950° C. in a non-oxidising atmosphere to cause the glass to flow together.

Example VIII 100 grams of potassium-soda glass containing about 70% silicon dioxide ($SiO_2$), 15% magnesium oxide (MgO) + calcium oxide (CaO), and about 15% potassium oxide ($K_2O$) + sodium oxide ($Na_2O$) is crushed, sieved, and then ground for about four days in a porcelain ball mill of 1 liter capacity with the addition of 250 c. c. of water. The mixture is then treated for about 10 minutes with hydrochloric acid (1 normal), and the glass powder sucked off on a filter of fine pores and washed with distilled water. The washed powder dried and then, by shaking, peptised in 1 liter of acetone. The particles are charged negatively.

In a manner similar to that described in Example I, a nickel-iron wire is coated with a thin layer of this glass by using a bath consisting of 1 part by volume of the suspension and 20 parts by volume of acetone, and by applying a positive voltage of about 100 volts. After the wire has passed through the electrophoretical bath, it is passed through a furnace heated to 850° C. and having an atmosphere of nitrogen containing a slight quantity of hydrogen. The nickel-iron wire is thus coated with an electrically-insulating, flexible glass layer capable of withstanding a higher temperature than the layers mentioned in Examples I and III.

Example IX

By using the suspension mentioned in Example II, a length of nickel-iron band is coated with a layer of this glass, two parallel pieces of sheet nickel being used on both sides of the band and acting as negative electrodes. After the coated band is heated for several minutes in a non-oxidising atmosphere in a furnace heated to 800° C., the glass layer flows together to form a continuous layer.

Example X 100 grams of quartz are pounded, sieved, and then ground for about six days in a porcelain ball mill of 1 liter capacity together with 250 c. c. of water. The fine quartz powder is sucked off on a filter of fine pores, washed with distilled water, and then dried.

Such a quantity of the quartz powder thus obtained is added to one of the suspensions described in Example I or II that there are about equal quantities by weight of quartz and glass, and is peptised therein by shaking. In the suspensions thus obtained the particles of both quartz and glass are negatively charged. By means of this suspension it is possible, in the manner described in connection with Example I, to coat a length of copper wire with an intimate mixture of quartz and glass particles, and to give the layer the desired coherence by heating. The coated wire is heated for about five minutes in a small furnace at 780° C., whereby a good, continuous, smooth layer is obtained. Due to the presence of the uniformly-distributed quartz particles, which at this temperature and with this duration of heating react with the glass to only a very slight extent and imparts to the layer a white opaque appearance, the solidity of the layer is increased during the said heating. This is particularly useful in cases such as described in Example I, because during the final heating there described the presence of the non-flowing grains prevents contact between adjacent turns of the coil, if the glass layer should soften excessively.

While we have described our invention with reference to specific examples and applications we do not wish to be limited thereto, but desire the appended claim to be construted as broadly as permissible in view of the prior art.

What we claim is:

A method of making a body formed of a wound glassy-coated conductor, comprising the steps of suspending in a suitable medium finely-divided material adapted to form a glassy coating, electrophoretically depositing the suspended material in a thin layer on a flexible core, heating the coated core to form the glassy material into a flexible coherent coating, winding the flexible coated core to form the body, and heating the body to make the coating compact and place the glassy material in a vitreous state.

EVERT JOHANNES WILLEM VERWEY.
PAUL CHRISTIAAN van der WILLIGEN.
JOHANNES HOEKSTRA.